United States Patent
Neuner et al.

(10) Patent No.: US 8,087,963 B2
(45) Date of Patent: Jan. 3, 2012

(54) JOINTS FOR MULTI-COMPONENT MOLDED ARTICLES

(75) Inventors: Franz Josef Neuner, Hillesheim (DE); Eduardo Alexander Joseph, Hofheim-Wildsachsen (DE)

(73) Assignee: Dow Corning Corporation, Midland, MI (US)

( * ) Notice: Subject to any disclaimer, the term of this patent is extended or adjusted under 35 U.S.C. 154(b) by 276 days.

(21) Appl. No.: 11/553,754

(22) Filed: Oct. 27, 2006

(65) Prior Publication Data

US 2007/0114939 A1    May 24, 2007

(30) Foreign Application Priority Data

Oct. 28, 2005   (GB) ................................. 0521969.6

(51) Int. Cl.
  *H01J 9/24* (2006.01)
(52) U.S. Cl. .......................................................... 445/23
(58) Field of Classification Search .................. 264/261, 264/263, 275, 267; 156/304.2, 304.5, 305; 313/623, 634; 445/22, 26, 24, 23; 362/459, 362/546; 427/66–67, 99.3
  See application file for complete search history.

(56) References Cited

U.S. PATENT DOCUMENTS

| | | | | |
|---|---|---|---|---|
| 3,916,502 A * | 11/1975 | Bagnulo | ................ | 29/890.14 |
| 5,413,743 A | 5/1995 | Prophet | | |
| 5,556,584 A | 9/1996 | Yamazaki et al. | | |
| 5,670,109 A | 9/1997 | DeRees | | |
| 6,059,483 A | 5/2000 | Owens et al. | | |
| 6,250,787 B1 * | 6/2001 | Matubara | ................ | 362/520 |
| 6,270,242 B1 * | 8/2001 | Suzuki et al. | ................ | 362/546 |
| 6,482,281 B1 * | 11/2002 | Schmidt | ................ | 156/108 |
| 6,720,242 B2 | 4/2004 | Burbach et al. | | |
| 2004/0085779 A1 * | 5/2004 | Pond et al. | ................ | 362/516 |

FOREIGN PATENT DOCUMENTS

| | | |
|---|---|---|
| DE | 10003063 A1 | 7/2007 |
| EP | 0307687 A1 | 3/1989 |
| FR | 2746902 A1 | 10/1997 |
| JP | 2003-007108 | 1/2003 |

OTHER PUBLICATIONS

EPO 0 892 209 A2 to Nestell et al.*
English language abstract for DE10003063 extracted from espacenet.com, Oct. 24, 2006.
English language abstract for EP0307687 extracted from espacenet.com, Dec. 14, 2007.
English language abstract for FR2746902 extracted from espacenet.com, Oct. 24, 2006.
English language translation and abstract for JP2003-007108 Dec. 14, 2007, 15 pages.

* cited by examiner

*Primary Examiner* — Toan Ton
*Assistant Examiner* — Zachary Snyder
(74) *Attorney, Agent, or Firm* — Howard & Howard Attorneys PLLC

(57) ABSTRACT

A method for sealing an automotive lamp assembly comprising a first member having a tongue assembly and a second member having a groove adapted to receive the tongue assembly of the first member. The process comprises the following steps (i) in situ injection molding a silicone composition or thermoplastic composition onto the tongue assembly (20) and/or into the groove (9) (ii) curing the silicone composition or thermoplastic composition in place to form a gasket (21, 10) which is chemically and/or physically bonded to said tongue assembly (20) and/or groove (9) and (iii) sealing the automotive assembly by mechanically engaging the first member and the second member, at least one of which has a cured in place gasket produced in accordance with steps (i) and (ii) above.

16 Claims, 4 Drawing Sheets

Figure 1A:
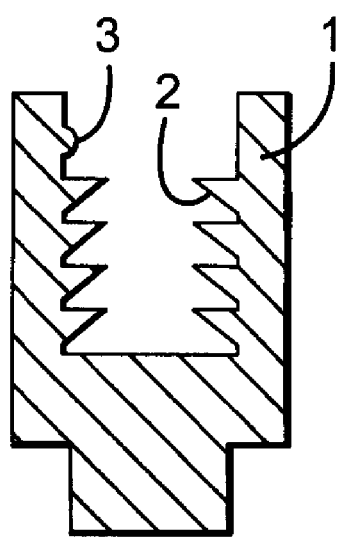

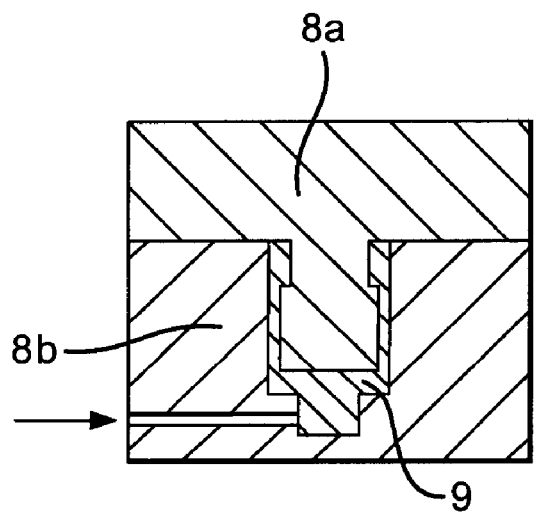
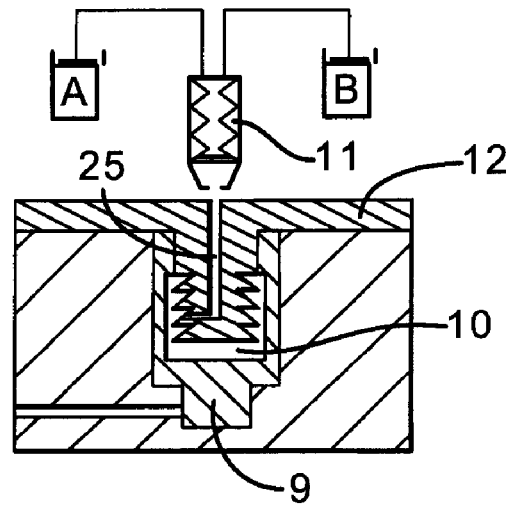
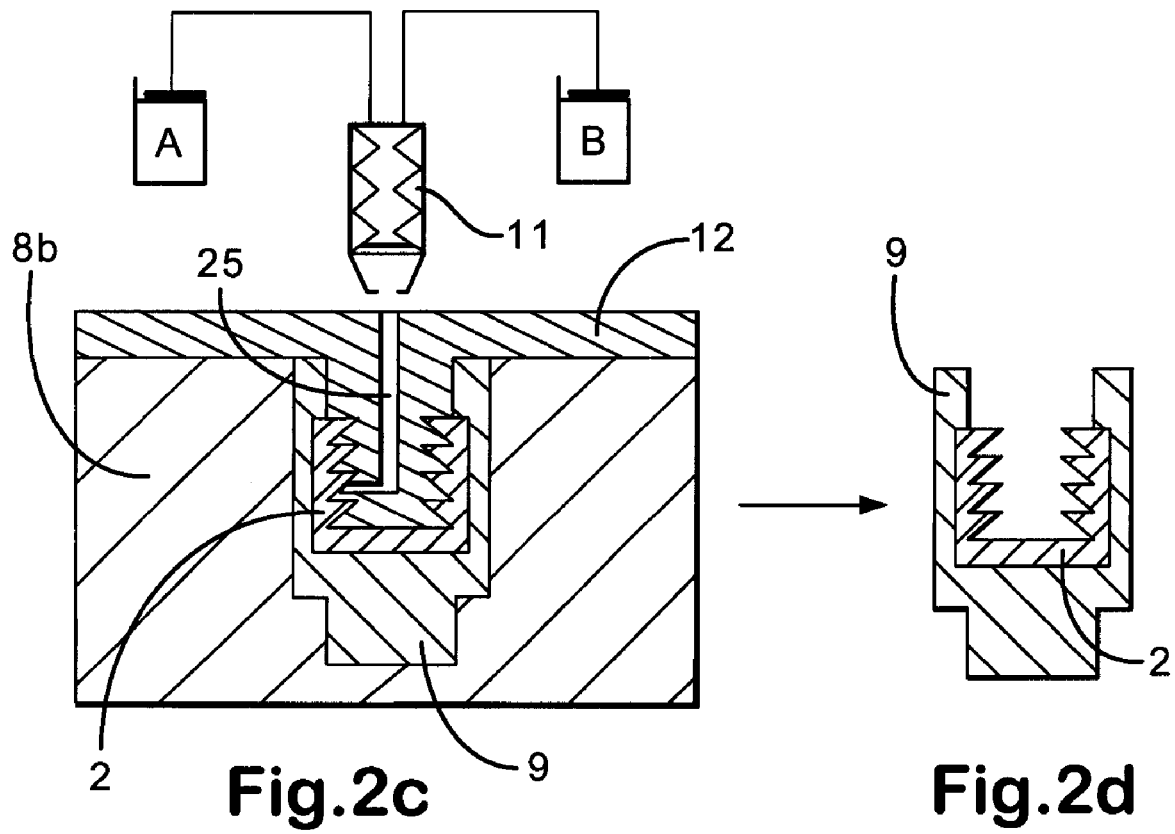

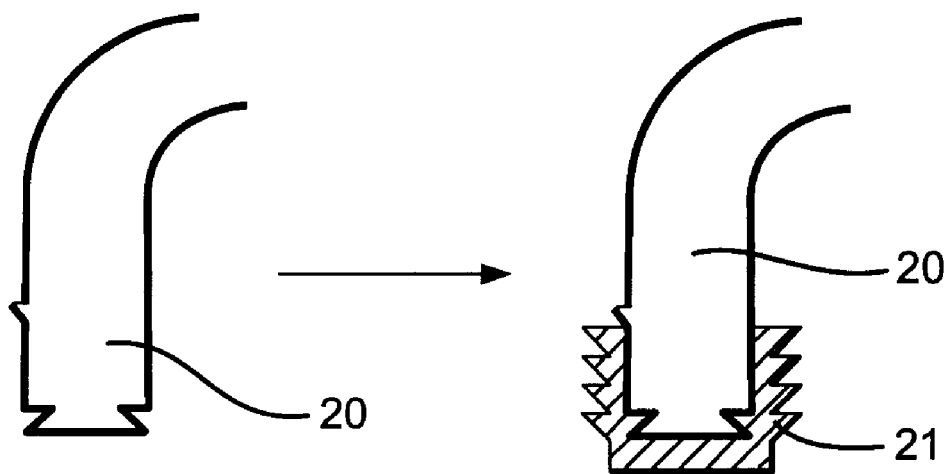
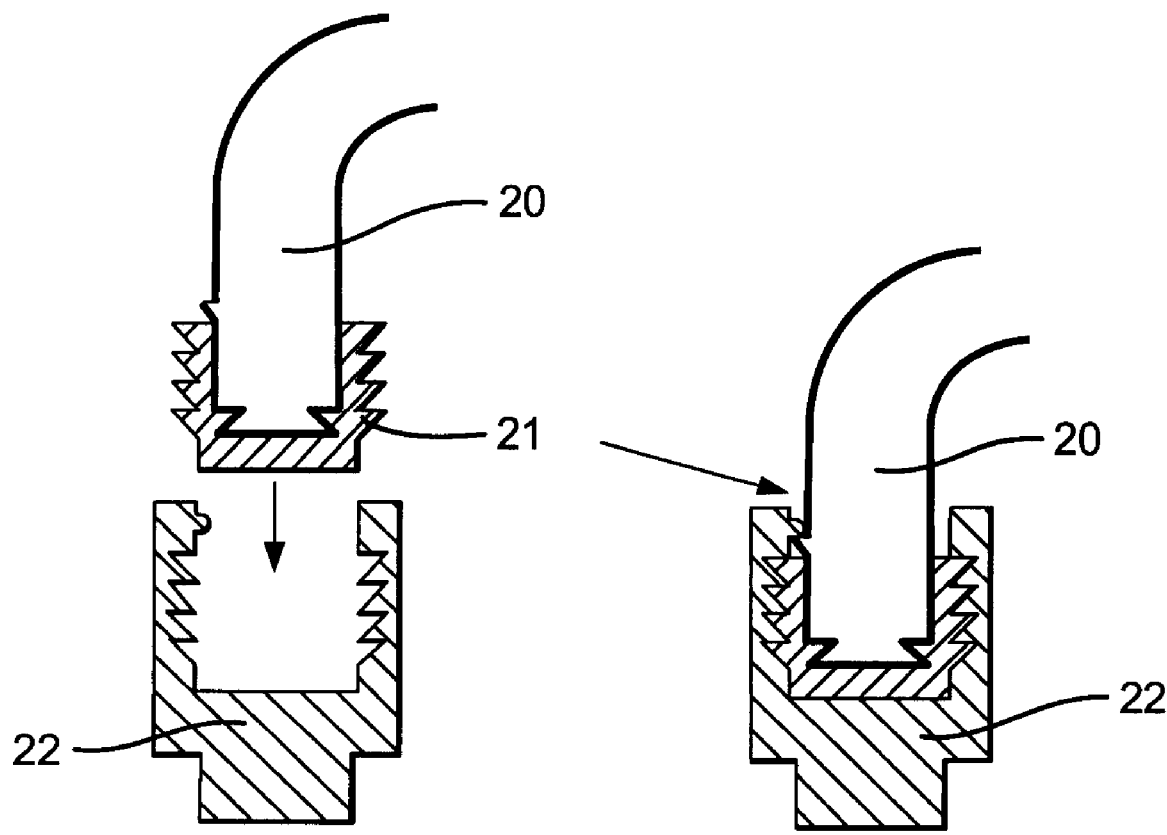
Fig.3a　　Fig.3b
Fig.3c　　Fig.3d

JOINTS FOR MULTI-COMPONENT MOLDED ARTICLES

RELATED APPLICATIONS

This application claims priority to and all the advantages of Great Britain Patent Application No. GB 0521969.6, filed on Oct. 28, 2005.

The present invention relates to a method for sealing joints for multi-component moulded articles and in particular to a sealed joint for joining a lens component to a lamp housing in a light assembly for e.g. use with automobiles (vehicle) and the like light assembly.

Typically, a lamp assembly includes a lamp housing and a lens that is secured to the lamp housing by a gasketing material or by a seal bead. Typically the lenses of substantially all currently made automobile headlamps are bonded to their respective lamp housings (including lamp housings) using gasketing materials such as silicone gasketing materials. Such seals are exceptionally difficult to break. The sealing process is generally carried out by having a groove around the internal periphery of the lamp housing unit which is sized to receive gasketing material and the outer rim of the lens. Upon insertion of the outer rim of the lens and the gasketing material into the lamp periphery the gasketing material is cured. The cured gasketing material forms a strong gasketing material bond between itself and the groove and itself and the outer rim of the lens. This currently prevailing method has been used for 15 to 20 years by most if not all of the major suppliers. Examples of the various processes proposed for sealing lamp assemblies are described in, for example, U.S. Pat. No. 6,059,483, U.S. Pat. No. 6,720,242, U.S. Pat. No. 5,413,743, FR2746902, DE10003063, U.S. Pat. No. 5,556,584, JP 2003-007108 and EP 0307687.

The gasketing materials used to provide a seal, have the disadvantage of requiring time and/or temperature to cure which increases manufacturing time thereby increasing cost. Gasketing material applied before components are assembled also poses a "glue squeeze out" problem requiring time for clean up. U.S. Pat. No. 5,670,109 attempted to remedy this glue squeeze out problem in some applications by low pressure injection of the gasketing material. Recently, the gasketing material has been displaced by a seal bead formed of a silicone or thermoplastic material introduced during the injection moulding process which fastens the lens to the housing without increasing cycle time. FR2746902 has a sealing joint placed in a groove formed around the periphery of the front glass. In U.S. Pat. No. 5,556,584 a seal structure is provided between a leg part of a front lens and a seal groove with a seal member formed from a solid foamed material which foams from an initial liquid state. The seal member is applied into the seal groove and the leg part of the front lens engaging with the seal groove is secured to the seal groove by a clip. DE10003063 describes a headlamp cover panel having a housing and a covering panel which have a groove and a wall respectively. The groove and panel engage each other and thereby clamp a seal between the free end of the wall and the base of the groove.

U.S. Pat. No. 5,413,743, discloses a lamp assembly that has a plastic housing and plastic lens moulded in a rotary transfer moulding machine. The rotary transfer moulding machine has upper and lower mateable housing dies and upper and lower mateable lens dies in which the housing and the lens are moulded simultaneously. The machine is then indexed so that the upper housing die (with the moulded housing retained in it) is mated with the lower lens die (with the moulding lens retained in it). These two dies are configured so that an annular seal bead cavity is formed at an interface of the dies. A seal bead is then moulded to join the moulded housing to the moulded lens to provide the lamp assembly. The machine is indexed again so that the upper housing die with the lamp assembly retained in it is mated with an overlay die and a decorative overlay is moulded on the peripheral margin of the lens. The lens is attached to the housing by an annular seal bead that joins the perimeter of the lens to a peripheral flange at an opening of the lamp housing.

A problem with the rotary transfer moulding process is that it requires a rotary transfer moulding machine, and further requires both members being joined to be formed at the same time which may not result in the lowest cost for each component, and may increase machinery complexity. Accordingly, it is desirable to have a process for joining two components regardless of when or where the components were formed.

U.S. Pat. No. 6,059,483 attempts to overcome some of the problems resulting from the use of a rotary transfer moulding system by providing a sealed plastic joint for joining first and second members together includes a tongue assembly attached to the first member, and a groove assembly attached to the second member. The tongue assembly has a base member with a tongue extending from the base member, and the groove assembly has spaced apart groove walls defining a groove therebetween. The groove receives the tongue to join the first and second members together. The surfaces of the tongue and groove define a channel which receives a thermoplastic bonding agent that bonds the tongue and groove together and forms a seal between them and between the first and second members.

The present invention seeks to provide an alternative solution to the sealing of the two or more mating parts by providing a new method of assembling the joint between the lens and the lamp housing by mechanically anchoring the periphery of the lens and lamp housing together by means of one or more silicone and/or thermoplastic cured-in-place gaskets and thereby avoiding the need for a gluing/sealing step.

In accordance with the present invention there is provided a method for sealing an automotive lamp assembly comprising a first member having a tongue assembly and a second member having a groove adapted to receive the tongue assembly of the first member; the process comprising the steps of:—
(i) in situ injection molding a silicone composition or thermoplastic composition onto the tongue assembly and/or into the groove;
(ii) curing the silicone composition or thermoplastic composition in place to form a gasket which is chemically and/or physically bonded to said tongue assembly and/or groove; and
(iii) sealing the automotive assembly by mechanically engaging the first member and the second member, at least one of which has a cured in place gasket produced in accordance with step (i) and (ii) above. Irrespective of whether the tongue assembly and/or groove is/are designed to have a gasket prepared in accordance with step (ii) of the above process, the first member and second member are designed to physically interengage to form a sealed unit.

Preferably, a gasket prepared in accordance with step (i) and (ii) of the process is provided on the tongue assembly of the first member in which case the groove assembly of the second member may or may not comprise a gasket. Preferably, if the groove does comprises an additional gasket, said gasket is also produced in accordance with step (i) and (ii) of the present invention. Irrespective of whether or not the groove assembly comprises a gasket in this instance the tongue and grove assemblies are designed to physically interengage.

A pre-cured gasket may be injection moulded into said groove or around said tongue during their manufacture. In the case where the pre-cured gasket forms part of the groove assembly of said second member, the second member comprising the groove assembly (for example the lamp housing), may be initially formed by injection moulding using e.g. a plastic granulate material and then a second mould adapted to produce the gasket is introduced to enable the injection moulding of the gasket in a predetermined design.

The tongue of the other member (the first member) is then produced in a suitable form which will physically engage the second member by means of the pre-cured gasket produced in accordance with step (i) and (ii) of the invention. The tongue of the first member may optionally comprise a further gasket preferably produced in accordance with step (i) and (ii) of the process designed to engage the groove of the second member.

The silicone and/or thermoplastic materials utilised may be cured in their respective moulds. Preferably the material utilised will only require a short cure period at relatively low temperatures (e.g. 30 seconds-2 minutes at a temperature up to 150° C.). It will of course be necessary to ensure that any demolding steps required to demold the member containing the gasket must be carried out without any damage and/or deformation of the gasket.

In the case where one of the tongue assembly and the groove receives a gasket in accordance with step (i) and (ii) of the above method and the other of said tongue assembly and said groove receives a pre-formed gasket prepared by a method other than by step (i) and (ii) of the above method said otherwise prepared gasket may be generated remote from the member of which, in use, it will form a part, i.e. it may be prepared by injection moulding in a separate mould and then, in an intermediate step, be inserted into the groove member or around the tongue member before being interengaged (i.e. interlocked) with the other member.

Where appropriate the gasket may be mechanically anchored to one member and be designed to adhere to the other member by heating subsequent to interengagement of the two members. In a further alternative the gasket may be formed using a hot melt type material such that the join between the members is heated subsequent to interengagement of the members although this latter embodiment is not preferred.

However, preferably the actual interengagement step itself is a completely non-chemical step, comprising the interlocking of the two members by physical means alone, thereby avoiding chemical adhesion processes and the like between the two members.

Advantages of the present invention over the current gasketing material process include the fact that the gasket is designed not merely to interengage the two members but in use when engaged they and/or the gasket will preferably be under compression. Most preferably the gasket will be under compression continuously once the two members have been interengaged.

The gaskets are potentially reusable provided they are undamaged during use.

Any suitable elastomeric material may be utilised as the gasketing material in the present invention. Examples include polyurethane elastomers, hot melt elastomeric based materials, polysulphide based elastomers, terpolymer elastomers made from ethylene-propylene diene monomer (EPDM) and silicone elastomers, preferably liquid silicone elastomers including one part and two-part room temperature vulcanisable (RTV) silicone elastomeric materials or one part and two-part heat vulcanisable silicone elastomeric materials.

Suitable gasketing materials need to meet a number of necessary criteria such as:—

1. The gasketing material must be temperature resistant up to a minimum of 80-90° C. (for use in headlamps), and a minimum of 110-120° C. (for use in fog lamps) but is preferably temperature resistant up to 180° C. and must remain flexible during exposure to such temperatures. Furthermore the mechanical properties of the gasketing material must be substantially unaffected by continuous long term exposure (>10 days) to such temperatures.
2. The gasketing material needs to possess low shrinkage properties during curing. Gasketing materials which have a significant degree of shrinkage during cure are not suitable to be used with this invention as the resulting seal between the groove and the rim would not be sufficiently tight fitting. Preferably shrinkage during cure of the gasketing material should be no greater than 10% and more preferably be a maximum of between 5 and 8 vol %.
3. The gasketing material requires a high degree of mechanical strength once cured: since the integrity of the seal relies partly on the fact that the gasketing material is mechanically anchored, it is important that the gasketing material show a minimum level of mechanical strength. The resistance to TEAR in particular is important. As an approximation the tear resistance should be >4 kN/m and preferably >15 kN/m, standard gasketing elastomers have values ranging from 4-15 kN/m, whereas silicone elastomers are particularly preferred as they have values of from 10-35 for cured liquid silicone elastomers.
4. A shore A durometer hardness value of from 5 to 65, preferably from 10 to 50.
5. Some degree of self levelling the gasketing material can be either thixotropic or self-levelling depending on the method used to mould the gasket on the part. If the method chosen is via injection moulding in high pressure equipment, the material can be either self levelling or thixotropic.
6. Low Fogging: this is needed particularly in the case of fog lamps. This is difficult to quantify, but the gasketing material should not FOG the inside surfaces of the lamp during lamp operation.

Suitable silicone based materials which might be utilised for such a purpose include hydrosilylation cured liquid silicone rubber compositions. Such compositions typically comprise (i) an organopolysiloxane comprising at least two unsaturated groups and having a viscosity of at least 100 mPa·s at 25° C.;
(ii) filler, which optionally be treated;
(iii) an organohydrogensiloxane having an average of greater than two silicon bonded hydrogen atoms per molecule having a viscosity of up to about 10 Pa·s at 25° C.;
(iv) a hydrosilylation catalyst;

Component (i) the organopolysiloxane polymer has the average composition of $$R_aSiO_{(4-a)/2}.$$

In which R is selected from substituted and unsubstituted monovalent hydrocarbon groups and is exemplified by alkyl groups such as methyl, ethyl, and propyl, preferably each alkyl group contains from 1 to 10 carbon atoms, more preferably each alkyl group is a methyl or ethyl group most preferably each alkyl group is a methyl group; alkenyl groups such as vinyl, allyl, butenyl, and hexenyl; aryl groups such as phenyl; and aralkyls such as 2-phenylethyl. The alkyl groups may be substituted with in particular fluoro groups such that one or more alkyl groups may be trifluoroalkyl groups, e.g.

trifluoropropyl groups or perfluoroalkyl groups. The average value of subscript a is from 1.95 to 2.05.

The organosiloxane polymer has at least 2 silicon-bonded unsaturated groups in each molecule. Preferably each unsaturated group may be the same or different and is selected from alkenyl groups and alkynyl groups, with alkenyl groups most preferred. Representative, non-limiting examples of the alkenyl groups are shown by the following structures; $H_2C=CH-$, $H_2C=CHCH_2-$, $H_2C=C(CH_3)CH_2-$, $H_2C=CHCH_2CH_2-$, $H_2C=CHCH_2CH_2CH_2-$, and $H_2C=CHCH_2CH_2CH_2CH_2-$. Representative, non-limiting examples of alkynyl groups are shown by the following structures; $HC\equiv C-$, $HC\equiv CCH_2-$, $HC\equiv CC(CH_3)-$, $HC\equiv CC(CH_3)_2-$, $HC\equiv CC(CH_3)_2CH_2-$ The unsaturated groups can be bonded in pendant positions, at the terminal positions, or at both positions. Preferably the silicone rubber composition in accordance with the present invention is a Liquid Silicone rubber. Silicone rubber compositions made using silicone based polymers that are thick flowable liquids are known in the industry as "liquid silicone rubbers". These materials can typically be pumped through a die or the like without the use of a screw-type extruder. Such polymers are thick flowable liquids and have a degree of polymerisation (dp) below about 1500 and have a viscosity of between about 200 to 100,000 mPa·s at 25° C.

The organosiloxane polymer can be a homopolymer or a copolymer or a mixture of such polymers. The siloxy units comprising the organosiloxane polymer are exemplified by dialkylsiloxy groups wherein each alkyl group may be the same or different, alkenylmethylsiloxy groups where the alkenyl group contains from 2 to 10 carbon atoms, preferably vinyl or hexenyl, and alkylphenylsiloxy wherein the alkyl groups are as hereinbefore described. Any suitable terminal groups in the organosiloxane polymer may be utilised, examples include trialkylsiloxy, and alkenyldialkylsiloxy groups wherein the alkenyl and alkyl groups are as hereinbefore described. Examples of the polymer which may be used include vinyldimethylsiloxy-endblocked dimethylsiloxane-vinylmethylsiloxane copolymer, vinyldimethylsiloxy-endblocked polydimethylsiloxane, vinylmethylhydroxysiloxy-endblocked dimethylsiloxane-vinylmethylsiloxane copolymer, and vinyldimethylsiloxy-endblocked dimethylsiloxane-methylphenylsiloxane-vinylmethylsiloxane copolymer vinyldimethylsiloxy-endblocked dimethylsiloxane-trifluoropropylmethylsiloxane copolymer, and vinyldimethylsiloxy-endblocked dimethylsiloxane-trifluoropropylmethylsiloxane-vinylmethylsiloxane copolymer.

Component (ii) may be any suitable inorganic filler or combination of inorganic fillers. For example, the compositions will normally contain one or more finely divided, reinforcing fillers such as high surface area fumed and/or precipitated silicas including rice hull ash and to a degree calcium carbonate. The term "precipitated silica" is for the sake of this application intended to meant any silica obtained by a precipitation reaction of a silicate, such as an alkaline metal silicate e.g. sodium silicate, with an acid such as sulphuric acid; any suitable silica precipitation process may be used here, preferred methods include: the addition of suitable acid into a silicate medium or the total or partial simultaneous addition of acid and silicate into water or a silicate medium. Additional non-reinforcing fillers such as crushed quartz, diatomaceous earths, barium sulphate, iron oxide, titanium dioxide and carbon black, talc, wollastonite may be used as well as silica and/or calcium carbonate fillers. Other fillers which might be used alone or in addition to the above include aluminite, calcium sulphate (anhydrite), gypsum, calcium sulphate, magnesium carbonate, clays such as kaolin, aluminium trihydroxide, magnesium hydroxide (brucite), graphite, copper carbonate, e.g. malachite, nickel carbonate, e.g. zarachite, barium carbonate, e.g. witherite and/or strontium carbonate e.g. strontianite Aluminium oxide, silicates from the group consisting of olivine group; garnet group; aluminosilicates; ring silicates; chain silicates; and sheet silicates. The olivine group comprises silicate minerals, such as but not limited to, forsterite and $Mg_2SiO_4$. The garnet group comprises ground silicate minerals, such as but not limited to, pyrope; $Mg_3Al_2Si_3O_{12}$; grossular; and $Ca_2Al_2Si_3O_{12}$. Aluninosilicates comprise ground silicate minerals, such as but not limited to, sillimanite; $Al_2SiO_5$; mullite; $3Al_2O_3.2SiO_2$; kyanite; and $Al_2SiO_5$ The ring silicates group comprises silicate minerals, such as but not limited to, cordierite and $Al_3(Mg,Fe)_2[Si_4AlO_{18}]$. The chain silicates group comprises ground silicate minerals, such as but not limited to, wollastonite and $Ca[SiO_3]$.

The sheet silicates group comprises silicate minerals, such as but not limited to, mica; $K_2Al_{14}[Si_6Al_2O_{20}](OH)_4$; pyrophyllite; $Al_4[Si_8O_{20}](OH)_4$; talc; $Mg_6[Si_8O_{20}](OH)_4$; serpentine for example, asbestos; Kaolinite; $Al_4[Si_4O_{10}](OH)_8$; and vermiculite.

Preferably filler utilised, particular silica fillers e.g. precipitated silica fillers have a BET specific surface ranging from 50 to 450 m²/g, preferably from 60 to 250 m²/g. The BET specific surface is determined by the BRUNAUER-EMMET-TELLER method described in the Journal of the American Chemical Society, Vol. 60, page 309, February 1938 and is in accordance with NF T 45007 standard (November 1987).

The proportion of such fillers when employed will depend on the properties desired in the elastomer-forming composition and the cured elastomer. Usually the total filler content of the composition will reside within the range from about 5 to about 800 parts by weight, preferably from 25 to 400 parts by weight per 100 parts by weight of the polymer.

Fillers as described above, unless treated generally have hydrophilic surfaces which render them difficult to mix into the composition. Therefore, if appropriate the filler may be treated using a suitable filler treating agent (or a mixture of treating agents) The treating agent may comprise one or more of a fatty acid or a fatty acid ester such as a stearate, but preferably comprises organosilanes, organosiloxanes, or organosilazanes such as hexaalkyl disilazane or short chain siloxane diols.

Component (iii) an organohydrogensiloxane having an average of greater than two silicon bonded hydrogen atoms per molecule and a viscosity of up to about 10 Pa·s at 25° C. The organohydrogensiloxane which functions as a cross-linker contains an average of at least two silicon-bonded hydrogen atoms per molecule, the remaining valences of the silicon atoms being satisfied by divalent oxygen atoms or by monovalent hydrocarbon radicals comprising one to seven carbon atoms. The monovalent hydrocarbon radicals can be, for examples, alkyls such as methyl, ethyl, propyl, tertiary butyl, and hexyl; cylcoalkyls such as cyclohexyl; and aryls such as phenyl and tolyl and/or trifluoroalkyl groups, e.g. trifluoropropyl groups or perfluoroalkyl groups. Such materials are well known in the art. The molecular structure of the organohydrogensiloxane may be linear, linear including branching, cyclic, or network-form or mixture thereof. There are no particular restrictions on the molecular weight of the organohydrogensiloxane, however it is preferable that the viscosity at 25° C. be 3 to 10,000 mPa·s. Furthermore, the amount of component (iii) that is added to the composition is an amount such that the ratio of the number of moles of hydrogen atoms bonded to silicon atoms to the number of moles of alkenyl groups bonded to silicon atoms is in the range of 0.5:1 to 20:1, and preferably in the range of 1:1 to 5:1. If this molar ratio is less than 0.5, curing of the present composition becomes insufficient, while if this molar ratio exceeds 20 hydrogen gas is evolved so that foaming occurs.

The silicon-bonded organic groups present in the organohydrogensiloxane can include substituted and unsubstituted alkyl groups of 1-4 carbon atoms that are otherwise free of ethylenic or acetylenic unsaturation. For the purpose of this application "Substituted" means one or more hydrogen atoms in a hydrocarbon group has been replaced with another substituent. Examples of such substituents include, but are not limited to, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as amino-functional groups, amido-functional groups, and cyano-functional groups; sulphur atoms; and sulphur atom containing groups such as mercapto groups.

Component (iv) is a hydrosilylation catalyst. Such hydrosilylation catalysts are illustrated by any metal-containing catalyst which facilitates the reaction of silicon-bonded hydrogen atoms of the SiH terminated organopolysiloxane with the unsaturated hydrocarbon group on the polyoxyethylene. The metals are illustrated by ruthenium, rhodium, palladium, osmium, iridium, or platinum.

Hydrosilylation catalysts are illustrated by the following; chloroplatinic acid, alcohol modified chloroplatinic acids, olefin complexes of chloroplatinic acid, complexes of chloroplatinic acid and divinyltetramethyldisiloxane, fine platinum particles adsorbed on carbon carriers, platinum supported on metal oxide carriers such as $Pt(Al_2O_3)$, platinum black, platinum acetylacetonate, platinum(divinyltetramethyldisiloxane), platinous halides exemplified by $PtCl_2$, $PtCl_4$, $Pt(CN)_2$, complexes of platinous halides with unsaturated compounds exemplified by ethylene, propylene, and organovinylsiloxanes, styrene hexamethyldiplatinum, Such noble metal catalysts are described in U.S. Pat. No. 3,923,705, incorporated herein by reference to show platinum catalysts. One preferred platinum catalyst is Karstedt's catalyst, which is described in Karstedt's U.S. Pat. Nos. 3,715,334 and 3,814,730, incorporated herein by reference. Karstedt's catalyst is a platinum divinyl tetramethyl disiloxane complex typically containing one weight percent of platinum in a solvent such as toluene. Another preferred platinum catalyst is a reaction product of chloroplatinic acid and an organosilicon compound containing terminal aliphatic unsaturation. It is described in U.S. Pat. No. 3,419,593, incorporated herein by reference. Most preferred as the catalyst is a neutralized complex of platinous chloride and divinyl tetramethyl disiloxane, for example as described in U.S. Pat. No. 5,175,325.

Ruthenium catalysts such as $RhCl_3(Bu_2S)_3$ and ruthenium carbonyl compounds such as ruthenium 1,1,1-trifluoroacetylacetonate, ruthenium acetylacetonate and triruthinium dodecacarbonyl or a ruthenium 1,3-ketoenolate may alternatively be used.

Other hydrosilylation catalysts suitable for use in the present invention include for example rhodium catalysts such as $[Rh(O_2CCH_3)_2]_2$, $Rh(O_2CCH_3)_3$, $Rh_2(C_8H_{15}O_2)_4$, $Rh(C_5H_7O_2)_3$, $Rh(C_5H_7O_2)(CO)_2$, $Rh(CO)[Ph_3P](C_5H_7O_2)$, $RhX^4{}_3[(R^{13})_2S]_3$, $(R^{14}{}_3P)_2Rh(CO)X^4$, $(R^{14}{}_3P)_2Rh(CO)H$, $Rh_2X^4{}_2Y^4{}_4$, $H_{a''}Rh_{b''}olefin_{c''}Cl_{d''}$, $Rh(O(CO)R^{13})_{3-n''}(OH)_{n''}$, where $X^4$ is hydrogen, chlorine, bromine or iodine, $Y^4$ is an alkyl group, such as methyl or ethyl, CO, $C_8H_{14}$ or $0.5C_8H_{12}$, $R^{13}$ is an alkyl radical, cycloalkyl radical or aryl radical and $R^{14}$ is an alkyl radical an aryl radical or an oxygen substituted radical, a" is 0 or 1, b" is 1 or 2, c" is a whole number from 1 to 4 inclusive and d" is 2, 3 or 4, n" is 0 or 1. Any suitable iridium catalysts such as $Ir(OOCCH_3)_3$, $Ir(C_5H_7O_2)_3$, $[Ir(Z^3)(En)_2]_2$, or $(Ir(Z^3)(Dien)]_2$, where $Z^3$ is chlorine, bromine, iodine, or alkoxy, En is an olefin and Dien is cyclooctadiene may also be used.

The hydrosilylation catalyst may be added to the present composition in an amount equivalent to as little as 0.001 part by weight of elemental platinum group metal, per one million parts (ppm) of the composition. Preferably, the concentration of the hydrosilylation catalyst in the composition is that capable of providing the equivalent of at least 1 part per million of elemental platinum group metal. A catalyst concentration providing the equivalent of about 3-50 parts per million of elemental platinum group metal is generally the amount preferred.

Optional additives for a silicone rubber composition in accordance with the present invention may comprise one or more of the following hydrosilylation catalyst inhibitors, rheology modifiers, pigments, colouring agents, anti-adhesive agents adhesion promoters, heat stabilisers, blowing agents, flame retardants, electrically and/or thermally conductive fillers, and desiccants.

Any suitable platinum group type inhibitor may be used. One useful type of platinum catalyst inhibitor is described in U.S. Pat. No. 3,445,420, which is hereby incorporated by reference to show certain acetylenic inhibitors and their use. A preferred class of acetylenic inhibitors is the acetylenic alcohols, especially 2-methyl-3-butyn-2-ol and/or 1-ethynyl-2-cyclohexanol which suppress the activity of a platinum-based catalyst at 25° C. A second type of platinum catalyst inhibitor is described in U.S. Pat. No. 3,989,667, which is hereby incorporated by reference to show certain olefinic siloxanes, their preparation and their use as platinum catalyst inhibitors. A third type of platinum catalyst inhibitor includes polymethylvinylcyclosiloxanes having three to six methylvinylsiloxane units per molecule.

Compositions containing these catalysts typically require heating at temperatures of 70° C. or above to cure at a practical rate. Room temperature cure is typically accomplished with such systems by use of a two-part system in which the cross-linker and inhibitor are in one of the two parts and the platinum is in the other part. The amount of platinum is increased to allow for curing at room temperature. The optimum concentration of platinum catalyst inhibitor is that which will provide the desired storage stability or pot life at ambient temperature without excessively prolonging the time interval required to cure the present compositions at elevated temperatures. This amount will vary widely and will depend upon the particular inhibitor that is used, the nature and concentration of the platinum-containing catalyst (iv) and the nature of the cross-linker (iii). Inhibitor concentrations as low as one mole of inhibitor per mole of platinum will in some instances yield a desirable level of storage stability and a sufficiently short curing period at temperatures above about 70° C. In other cases, inhibitor concentrations of up to 10, 50, 100, 500 or more moles per mole of platinum may be needed. The optimum concentration for a particular inhibitor in a given composition can be determined by routine experimentation.

The rheological modifiers include silicone organic co-polymers such as those described in EP 0802233 based on polyols of polyethers or polyesters; non-ionic surfactants selected from the group consisting of polyethylene glycol, polypropylene glycol, ethoxylated castor oil, oleic acid ethoxylate, alkylphenol ethoxylates, copolymers or ethylene oxide (EO) and propylene oxide (PO), and silicone polyether copolymers; as well as silicone glycols.

Any suitable adhesion promoter(s) may be incorporated in a composition in accordance with the present invention. These may include for example alkoxy silanes such as aminoalkylalkoxy silanes, epoxyalkylalkoxy silanes, for example, 3-glycidoxypropyltrimethoxysilane and, mercaptoalkylalkoxy silanes and γ-aminopropyl triethoxysilane, reaction products of ethylenediamine with silylacrylates. Isocyanurates containing silicon groups such as 1,3,5-tris (trialkoxysilylalkyl) isocyanurates may additionally be used. Further suitable adhesion promoters are reaction products of epoxyalkylalkoxy silanes such as 3-glycidoxypropyltrimethoxysilane with amino-substituted alkoxysilanes such as 3-aminopropyltrimethoxysilane and optionally alkylalkoxy silanes such as methyl-trimethoxysilane. epoxyalkylalkoxy silane, mercaptoalkylalkoxy silane, and derivatives thereof.

Heat stabilizers may include Iron oxides and carbon blacks, Iron carboxylate salts, cerium hydrate, titania, barium zirconate, cerium and zirconium octoates, and porphyrins.

Flame retardants may include for example, carbon black, hydrated aluminium hydroxide, and silicates such as wollastonite, platinum and platinum compounds.

Electrically conductive fillers may include carbon black, metal particles such as silver particles any suitable, electrically conductive metal oxide fillers such as titanium oxide powder whose surface has been treated with tin and/or antimony, potassium titanate powder whose surface has been treated with tin and/or antimony, tin oxide whose surface has been treated with antimony, and zinc oxide whose surface has been treated with aluminium.

Thermally conductive fillers may include metal particles such as powders, flakes and colloidal silver, copper, nickel, platinum, gold aluminium and titanium, metal oxides, particularly aluminium oxide ($Al_2O_3$) and beryllium oxide (BeO); magnesium oxide, zinc oxide, zirconium oxide; Ceramic fillers such as tungsten monocarbide, silicon carbide and aluminium nitride, boron nitride and diamond.

Other optional ingredients include handling agents, acid acceptors, and UV stabilisers.

Handling agents are used to modify the uncured properties of the silicone rubber such as green strength or processability sold under a variety of trade names such as SILASTIC® HA-1, HA-2 and HA-3 from Dow Corning Corporation.

The acid acceptors may include Magnesium oxide, calcium carbonate, Zinc oxide and the like.

The ceramifying agents can also be called ash stabilisers and include silicates such as wollastonite.

Prior to use the final composition as hereinbefore described must be maintained in at least two parts which can be easily mixed together in a final mixing step immediately prior to curing the resultant composition to form an elastomeric solid. Preferably the composition is stored in either two or three parts prior to use.

In a preferred two part composition a first part hereafter referred to as Part A will preferably comprise polymer, treated filler, catalyst and possibly residual treating agent and the second part hereafter referred to as part B will comprise cross-linker or cross-linker and polymer. Part A and Part B in a two part composition may be mixed in any suitable ratio in an amount such that the ratio of the number of moles of hydrogen atoms bonded to silicon atoms to the number of moles of alkenyl groups bonded to silicon atoms is in the range of 0.5:1 to 20:1, and preferably in the range of 1:1 to 5:1. Typically the cross-linker will be present in the polymer at a level in Part B such that Part A and Part B will be mixed preferably in a ratio of from 1:10 to 100:1, more preferably 20:1 to 1:5 and most preferably from 10:1 to 1:2.

Optional additives may be present in either part A or part B providing they do not negatively affect the properties of the resulting elastomer.

Particularly preferred silicone based materials suitable for the preparation of gaskets in accordance with the method above include for example the SILASTIC®9280 range of materials, DOW CORNING® 1540/20P range of products, DOW CORNING® D94-45 range of products, DOW CORNING® D94-30, SILASTIC®T-1, SILASTIC® T-2, SILASTIC® T-4 and SILASTIC® S-2 all of which are sold by Dow Corning Corporation of Michigan USA.

The proposed sealing method of the present invention provides the manufacturer with a number of clear advantages, over the prior art by avoiding complicated adhesion/sealing steps in the process for namely the possibility to easily dismantle the headlamp or the like Preferably the two members of the automotive lamp assembly are a lens and a lamp housing of a sealed light unit. The lens and the lamp housing are at least partially mechanically anchored together by means of the process in accordance with the present invention as opposed to being adhered together. Most preferably the first member is the lens and the tongue is in the form of the outer rim of the lens and the second member is the lamp housing and the groove is a groove in the periphery of the lamp housing. In one embodiment of the invention a chemical bond is formed between the gasketing material and one surface of the tongue or groove of the first member or the second member respectively but the engagement between the tongue and groove is physically maintained rendering the light assembly reusable and allowing for the replacement of bulbs after their failure as opposed to the need to replace the full lamp assembly. The absence of adhesion between the first and second members ensures that the mating surfaces can be separated from each other for re-use and/or recycling of the lamp.

Typically the lens is fabricated of glass or a clear polycarbonate or the like which may be coated or uncoated and the lamp housing and most particularly the peripheral groove thereof is fabricated from a suitable metal or a thermoset or thermoplastic plastic material for example polypropylene, polyamide or polybutyleneterephthalate.

As described it is desired that the gasket material is elastomeric and may show good adhesion on its own to the component onto which it is moulded. If this is not the case, then adhesion can be promoted to the surface where it is needed via surface activation techniques like chemical priming, or via flame treatment, or via plasma treatment. Alternatively, the need for adhesion to the selected surface can be overcome by using a technique where the gasketing material interlocks with the surface during the moulding process.

Figure 1B:
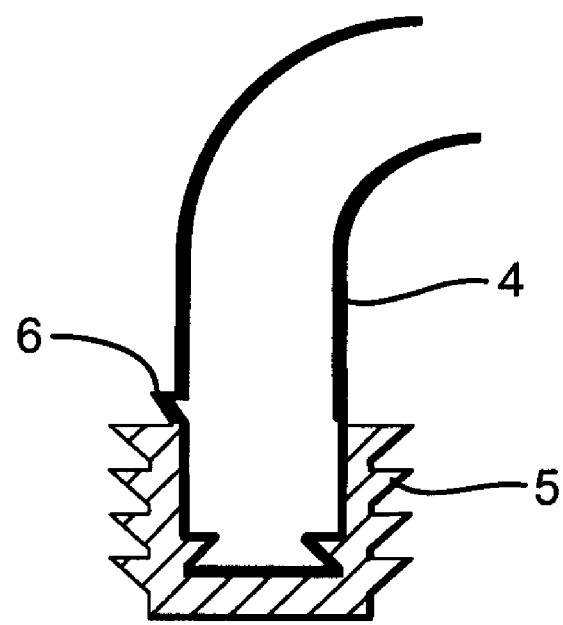
Figure 4A:
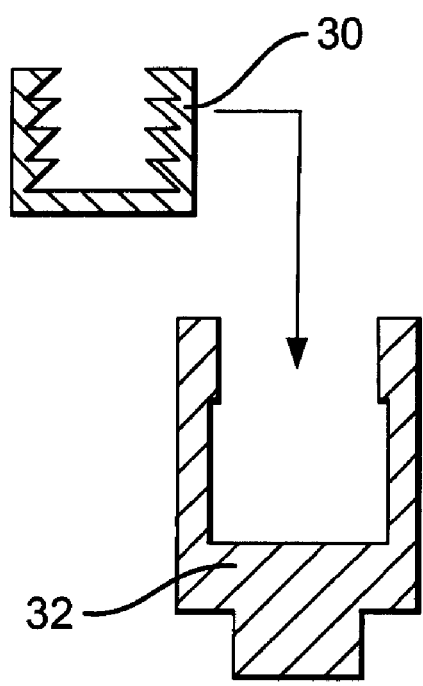
Figure 4B:
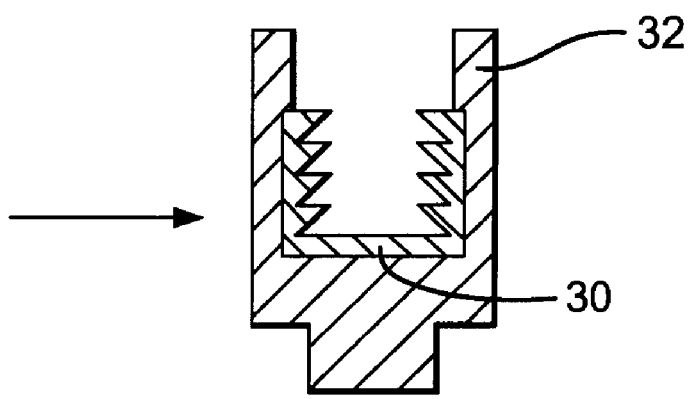

The invention will now be described by way of example and with reference to the figures in which FIGS. 1a and 1b show a lamp housing containing a gasket in accordance with the present invention and part of a lens the end of which is covered by a gasket in accordance with the present invention respectively;

FIGS. 2a, 2b, 2c and 2, d depict a method for forming a joint using a gasket of the type described in FIG. 1a;

FIGS. 3a, 3b, 3c and 3d depict a method for forming a joint in using a gasket system as described in FIG. 1b FIGS. 4a and 4b depict a non-cured in place gasket used in the formation of a joint in accordance with the present invention.

Referring initially to FIG. 1a, in FIG. 1a there is provided a groove assembly 1 (typically forming part of a lamp housing comprising a sealed in place gasket 2 made by in-situ injection molding in accordance with the present invention. A projection 3, into the groove assembly is also provided to lock a tongue assembly (typically in the form of the outer rim of a lens unit) in place once inserted into the groove assembly 1. The tongue assembly is formed by injection moulding and is designed such that the outer rim is adapted to physically interengage (i.e. interlock) with the cured in place gasket 2 in groove assembly 1 and in use the gasket is maintained under compression. Clearly the groove assembly 1 may form part of the outer rim of a lens and the tongue assembly may form part of the lamp housing.

Alternatively, as shown in FIG. 1b a sealed in place gasket 5 may be provided around the tongue assembly 4 which is designed to interengage (i.e. interlock) with a preformed groove assembly 1. Such a tongue assembly 4 may be made by a process in accordance with the present invention and provided with an outwardly facing projection 6 (intended to interlock with a projection such as projection 3 in FIG. 1a). In both of the above embodiments the groove assembly 1 and tongue assembly 4 are intended to be designed such that they physically interlock by inserting the tongue assembly into the groove assembly with the sealed in place gasket (2 or 5) forming a seal between the two assemblies and, in use, the gasket is under compression.

A preferred process for preparing the groove unit in accordance with the invention depicted in FIG. 1a is provided in FIG. 2. FIG. 2a depicts the injection moulding of a gasketless groove unit 9 in a first mould 8a, 8b. Typically this forms part of the lamp housing unit (sometimes referred to as the reflector unit as not only does it house the lamp but also comprises reflecting materials to enhance the brightness of the light generated). The groove unit 9 may be metallic or plastic and in both cases may be injection molded. As shown in FIG. 2b, subsequent to curing a second mould 12 designed to form the cured in place gasket 2 in groove unit 9 is fitted in place, providing a void 10 in the shape of the cure in place gasket, into which the elastomeric composition used to form gasket 2 is to be injected. Mould 12 comprises a channel 25 through which uncured elastomer is directed prior to filling void 10 and forming gasket 2 upon curing. As can be seen in FIG. 2c the elastomeric composition used to form the cured in place gasket is injected into channel 25 in second mould 12 via an injector 11 and once void 10 has been filled with a prerequisite amount of uncured elastomer, the elastomer is cured in place to form gasket 2. In FIGS. 2b and 2c the elastomer utilised to form the cured in place gasket 2 comprises a two part material A and B which are mixed prior to injection into channel 25 of mould 12 through injector 11. It should be noted that a one part or greater than two part mixture may alternatively be used as required.

FIG. 2c shows the resulting groove unit 9 comprising a sealed in place gasket 2. The groove unit 9 containing cured in place gasket 2 is then removed from the mould(s).

FIG. 3 shows the intended method for the production of a tongue unit depicted in FIG. 1b. The tongue 20 (FIG. 3a) has a cure in place gasket 21 moulded around it by injection moulding (not shown). Once cured the tongue 20 having a cured in place gasket 21 can be inserted into a preprepared groove unit 22. The groove unit, 22, is designed to interengage, (interlock), with the gasketed, 21, tongue unit 20 (FIG. 3c) to form a jointed unit as shown in FIG. 3d. In a further embodiment (not shown) the means for fixing the gasket onto a selected surface during the moulding process may be provided in the form of one or more apertures, holes, or protrusions in the part designed to interlock with the gasketing material. In this case gasketing material not only forms the gasket but also enters and cures inside said apertures or holes etc. during the moulding process, thereby avoiding the need for chemical adhesion.

In accordance with the present invention at least one gasket attached to the tongue or groove as required has to be produced in accordance with the method in accordance with the present invention. FIG. 4 depicts how a pre-formed gasket might be used in conjunction with the groove (when a gasket has already been prepared for the tongue by the method in accordance with the present invention). In this case a pre-formed gasket is physically inserted into the groove having been previously manufactured elsewhere. The preformed gasket 30 has been preformed by injection moulding and is inserted into a preformed groove unit 32 (FIG. 4a) to form a gasket containing groove unit 30,32 in FIG. 4b. Whilst this method comprises an embodiment of the invention it is not preferred as the insertion process will be labour intensive, particularly in respect to ensuring an optimum fit of the gasket within the groove not least because of the size of the groove itself.

It is to be understood that the above figures are intended to show the general intention of the invention for illustrative purposes.

The invention claimed is:

1. A method for sealing a lamp assembly comprising a first member having a tongue assembly and a second member having a groove adapted to receive the tongue assembly of the first member; the process comprising the steps of:
   (i) in situ injection molding a silicone composition or thermoplastic composition onto the tongue assembly and/or into the groove;
   (ii) curing the silicone composition or thermoplastic composition in place to form a gasket which is chemically and/or physically bonded to said tongue assembly or the groove; and
   (iii) inserting the tongue assembly into the groove after curing the silicone composition or thermoplastic composition in place to form the gasket with the gasket mechanically interlocking the first member with the second member, without adhesion between the first and second members, and sealing the lamp assembly, at least one of the first member and the second member having a cured in place gasket produced in accordance with steps (i) and (ii) above.

2. A method in accordance with claim 1 wherein the gasket is made from polyurethane elastomers, hot melt elastomeric based materials, polysulphide based elastomers, terpolymer elastomers made from ethylene-propylene diene monomer (EPDM) and silicone elastomers.

3. A method in accordance with claim 1 wherein the gasket is a liquid silicone elastomer selected from one part vulcanisable (RTV) silicone elastomeric materials, two-part RTV silicone elastomeric materials, one part heat vulcanisable (HTV) silicone elastomeric materials and two-part HTV silicone elastomeric materials.

4. A method in accordance with claim 1 wherein the gasket is prepared in contact with the tongue assembly.

5. A method in accordance with claim 1 wherein the first member is a lens and the tongue assembly is an outer rim of the lens.

6. A method in accordance with claim 1 wherein the second member is a lamp housing.

7. A method in accordance with claim 1 wherein the gasket is chemically bonded to the tongue or groove.

8. A lamp assembly produced according to the method of claim 1.

9. A lamp assembly produced according to the method of claim 2.

10. A lamp assembly produced according to the method of claim 3.

11. A method in accordance with claim 1 further comprising mechanically anchoring the gasket to one of the first member and the second member.

12. A method in accordance with claim 11 further comprising adhering the gasket to the other of the first member and the second member.

13. A method in accordance with claim 1 further comprising compressing the gasket between the first member and the second member.

14. A method in accordance with claim 1 wherein the absence of adhesion between the first and second members ensures that the tongue assembly and the groove can be separated from each other for re-use and/or recycling of the lamp assembly.

15. A method in accordance with claim 14 wherein the first member is a lens and the second member is a lamp housing and wherein the tongue assembly is an outer rim of the lens and the groove is in the periphery of the lamp housing.

16. A method in accordance with claim 15 wherein the gasket is prepared in contact with the tongue assembly and chemically bonded to the tongue assembly and is mechanically anchored to the groove.

* * * * *